US011859426B2

(12) United States Patent
Shaaban et al.

(10) Patent No.: US 11,859,426 B2
(45) Date of Patent: Jan. 2, 2024

(54) HINGE ASSEMBLY

(71) Applicant: Kohler Co.

(72) Inventors: Nameer Shaaban, Kohler, WI (US); Sandeep Vishwasrao Pawar, Pune (IN); Yogesh Pansare, Pune (IN)

(73) Assignee: KOHLER CO., Kohler, WI (US)

( * ) Notice: Subject to any disclaimer, the term of this patent is extended or adjusted under 35 U.S.C. 154(b) by 88 days.

(21) Appl. No.: 17/478,585

(22) Filed: Sep. 17, 2021

(65) Prior Publication Data

US 2022/0106820 A1 Apr. 7, 2022

(30) Foreign Application Priority Data

Oct. 7, 2020 (IN) ............................. 202011043601

(51) Int. Cl.
*E05D 5/02* (2006.01)
*E05D 7/04* (2006.01)
(Continued)

(52) U.S. Cl.
CPC ................ *E05D 7/04* (2013.01); *E05D 3/02* (2013.01); *E05D 2007/0469* (2013.01);
(Continued)

(58) Field of Classification Search
CPC ... E05D 5/0246; E05D 5/0253; E05D 5/0261; E05D 5/0269; E05D 7/04; E05D 3/02; E05D 2007/0469; E05D 2005/0263; E05D 2005/0261; E05D 2005/0269; E05D 7/081; E05D 7/08; E05D 2003/027; E05Y 2900/114; E05Y 2900/132; E05Y 2600/502; E05Y 2600/60; E05Y 2201/11;
(Continued)

(56) References Cited

U.S. PATENT DOCUMENTS 1,700,086 A * 1/1929 Sherwood ................. E05F 5/02 16/85
5,339,493 A 8/1994 MacIntyre
(Continued)

FOREIGN PATENT DOCUMENTS

CN 103899173 A 7/2014
GB 2470778 A * 12/2010 ........... E05D 5/0246

OTHER PUBLICATIONS

Stable quality 3D adjustable hinge soft closing cabinet hinge. Dongguan Kav Hardware Co., Ltd. (model No. NO004) https://www.alibaba.com/product-detail/Stable-quality-3D-adjustable-hinge-soft_60407052127.html.
(Continued)

*Primary Examiner* — Chuck Y Mah
(74) *Attorney, Agent, or Firm* — FOLEY & LARDNER LLP

(57) ABSTRACT

A hinge system for a panel includes a first plate configured for coupling to a structure, a second plate rotatably coupled to the first plate and disposed on a first side of the panel, a third plate disposed on a second side of the panel opposite the first side, and a slider piece disposed within the panel, the slider piece having a first slot disposed therein. The second plate is coupled to the third plate via at least one fastener, wherein the at least one fastener is configured to slide within the first slot of the slider piece such that the panel may translate relative to the second and the third plates.

20 Claims, 6 Drawing Sheets

(51) Int. Cl.
*E05D 3/02* (2006.01)
*E05F 5/00* (2017.01)

(52) U.S. Cl.
CPC ............. *E05F 5/00* (2013.01); *E05Y 2201/11* (2013.01); *E05Y 2900/114* (2013.01); *E05Y 2900/132* (2013.01)

(58) Field of Classification Search
CPC ......... E05F 1/1215; E05F 1/12; E05F 1/1207; E05F 3/20; E05F 3/18; E05F 5/00; E05F 11/385; E06B 3/54; A47K 3/362; A47K 2003/367; A47F 3/12; A47F 3/125; Y10T 16/534; Y10T 16/5383; Y10T 16/53828; Y10T 16/53845
See application file for complete search history.

(56) References Cited

U.S. PATENT DOCUMENTS

| | | | | | |
|---|---|---|---|---|---|
| 5,392,565 | A * | 2/1995 | Rentschler | E05D 5/023 D25/60 |
| 5,701,636 | A | 12/1997 | Jahnke | |
| 6,092,263 | A * | 7/2000 | Boue | E05D 3/12 16/335 |
| 6,618,871 | B2 | 9/2003 | Kopacz et al. | |
| 7,552,511 | B2 | 6/2009 | Campbell et al. | |
| 7,676,887 | B2 | 3/2010 | Chung | |
| 8,429,794 | B2 | 4/2013 | Tagtow et al. | |
| 9,145,721 | B2 | 9/2015 | Bartels et al. | |
| 9,273,511 | B2 | 3/2016 | Wei | |
| 9,644,410 | B2 | 5/2017 | Hayes et al. | |
| 9,644,411 | B2 * | 5/2017 | Gompper | E05D 7/04 |
| 9,675,215 | B2 | 6/2017 | Corpuz et al. | |
| 2008/0307606 | A1 | 12/2008 | Karlsson | |
| 2012/0079682 | A1 | 4/2012 | Cheng | |
| 2013/0305488 | A1 * | 11/2013 | Dodge | G16Z 99/00 16/245 |
| 2014/0165332 | A1 | 6/2014 | Wei | |
| 2016/0108654 | A1 * | 4/2016 | White | E05D 5/0246 16/382 |
| 2018/0298658 | A1 * | 10/2018 | Brun | E05D 3/12 |
| 2019/0048634 | A1 * | 2/2019 | Sevastopoulos | E05D 7/086 |
| 2021/0285271 | A1 * | 9/2021 | Windmann | E05D 11/0054 |

OTHER PUBLICATIONS

First Office Action for Chinese Patent App. No. 202111173786 dated Dec. 20, 2022, 7 pages (with English translation).
CN Second Office Action on Serial No. 202111173786 dated May 6, 2023.

* cited by examiner

HINGE ASSEMBLY

CROSS-REFERENCE TO RELATED APPLICATIONS

This application claims the benefit and priority to Indian Provisional Application No. 202011043601, filed Oct. 7, 2020, which is incorporated herein by reference in its entirety.

BACKGROUND

The present disclosure relates generally to adjustable hinge assemblies for pivoting panels and/or doors.

Generally speaking, pivoting panels or doors are among the final installations for a structure and, accordingly, must accommodate any previous imperfections, which frequently include out-of-plumb conditions. Out-of-plumb conditions consequently require shimming and/or separate structures to enable proper pivoting and seating of the panel(s) or door in a door jamb. Such ad hoc methods introduce numerous design limitations and often require numerous trial and error iterations to achieve a functional solution. Alternative methods often entail implementing flexible joints and/or materials to accommodate out-of-plumb conditions; however, these methods are frequently prone to fatigue and do not provide a durable, long-term solution. Yet other methods implement hinges that extend along the hinging length of the panel or door with overlapping structural members that can be adjusted with respect to each other, which pose a multitude of functional and aesthetic disadvantages.

Accordingly, it would be advantageous to provide an improved hinge that is adaptable to pivoting panels and/or doors and is easily adjustable to accommodate out-of-plumb conditions.

SUMMARY

One aspect of the present disclosure relates to a hinge. The hinge includes a first plate, a second plate rotatably coupled to the first plate at a joint, a third plate disposed substantially parallel to the second plate, and a slider piece disposed between the second plate and the third plate, the slider piece having a first slot disposed therein. The second plate is coupled to the third plate via at least one fastener, wherein the at least one fastener is configured to slide within the first slot of the slider piece.

In various embodiments, the second plate is rotatably coupled to the first plate via an arm extending from the first plate. In some embodiments, the second plate includes a receiving portion disposed at an end of the second plate nearest the joint, wherein the receiving portion is configured to connect with the arm of the first place to form a joint. In other embodiments, the joint includes a damper to control rotation at the joint. In yet other embodiments, the third plate includes a second slot disposed therethrough, wherein the slider piece includes a tab, and wherein the tab is configured to fit within the second slot. In various embodiments, the slider piece includes a frame, the first slot being defined by the frame, and wherein the tab is disposed within a top portion of the frame. In some embodiments, the at least one fastener includes two fasteners, wherein a width of the second slot corresponds to a distance between the two fasteners.

Another aspect of the present disclosure relates to a hinge system for a panel. The hinge system for a panel includes a first plate configured for coupling to a structure, a second plate rotatably coupled to the first plate and disposed on a first side of the panel, a third plate disposed on a second side of the panel opposite the first side, and a slider piece disposed within the panel, the slider piece having a first slot disposed therein. The second plate is coupled to the third plate via at least one fastener, wherein the at least one fastener is configured to slide within the first slot of the slider piece such that the panel may translate relative to the second and the third plates.

In various embodiments, the system further includes a first gasket and a second gasket, the first gasket being disposed between the second plate and the panel and the second gasket being disposed between the third plate and the panel. In some embodiments, the second plate includes a receiving portion, the receiving portion being configured to fit within a recess of the panel. In other embodiments, the second plate further includes a boss feature, the boss feature configured to receive the at least one fastener. In yet other embodiments, the third plate includes a second slot disposed therethrough, wherein the slider piece includes a tab, and wherein the tab is configured to fit within the second slot. In various embodiments, a position of the tab indicates a position of the panel. In some embodiments, the system further includes at least one stopper, wherein the second plate is configured to receive the at least one stopper, the at least one stopper being configured to prevent abrasive contact between the second plate and the first plate. In other embodiments, the at least one stopper includes a first stopper and a second stopper, the first stopper being received at a first end of the second plate and the second stopper being received at a second end of the second plate. In yet other embodiments, the system further includes a cover assembly, the cover assembly having a first cover configured to conceal the first plate, a second cover configured to conceal the second plate, and a third cover configured to conceal the third plate. In various embodiments, at least one of the first cover, the second cover, or the third cover is respectively coupled to the first plate, the second plate, or the third plate via a snap fit connection.

Yet another aspect of the present disclosure relates to a method of mounting a panel. The method includes inserting a slider piece into a panel, positioning a first plate on a first side of the panel, positioning a second plate on a second side of the panel, and coupling the second plate to the first plate using at least one fastener, wherein the at least one fastener is configured to pass through and slide relative to a slot within the slider piece.

In various embodiments, the method further includes positioning the panel relative to the first plate and the second plate. In some embodiments, the method also includes tightening the at least one fastener after positioning the panel.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
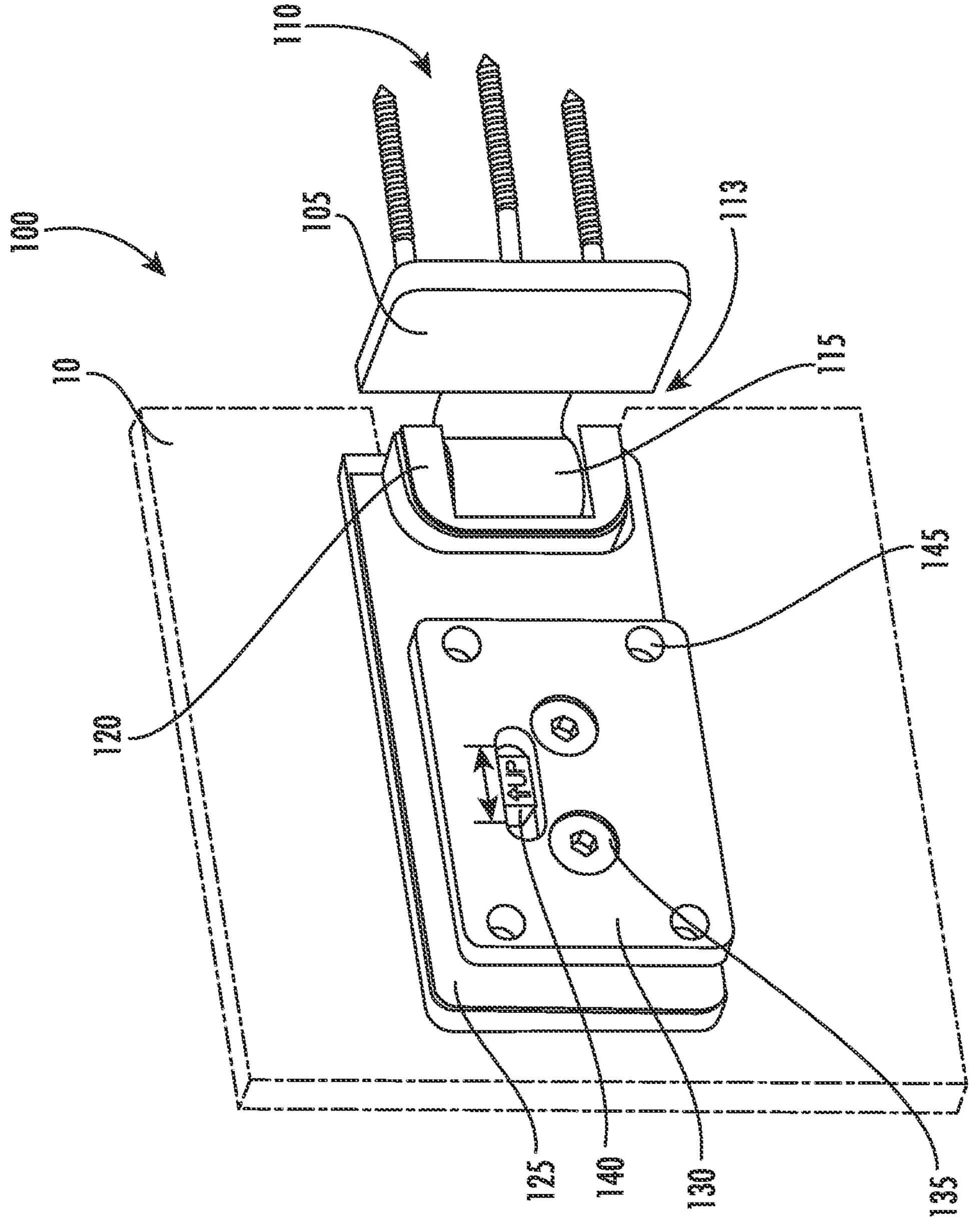
FIG. 1 is a perspective view of an adjustable hinge coupled to a pivoting door, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

One embodiment of the present disclosure relates to an adjustable hinge assembly configured to couple a pivoting door or panel to a wall, frame, or other fixed structure. In various embodiments, the hinge assembly may include an inner plate, an outer plate configured to couple to the inner plate via two or more support fasteners that extend from the inner plate, through the door or panel, and into the outer plate. The hinge assembly may also include a slider piece, configured to fit within the door or panel and having a first slot disposed therethrough. In various embodiments, the hinge assembly may be installed within a glass panel and the slider may protect the glass from abrasive contact (e.g., metal contact from a boss feature of the outer plate, etc.) and provide a low friction surface to facilitate sliding across the interface. The hinge assembly is configured such that the support fasteners coupling the inner plate to the outer plate pass through and are supported within the first slot of the slider piece. The first slot of the slider piece may have a length that is greater than a width of a boss feature of the outer plate such that the slider, and thus the door or panel, may be adjusted relative to the inner and outer plates to accommodate varying fits and/or out-of-plumb conditions. The boss feature is configured to fit within the first slot of the slider piece. The outer plate may have a length that is greater than a length of the inner plate such that the outer plate extends to an edge of the door or panel nearest to the structure. The outer plate edge nearest the structure may be rotatably coupled at a joint to an anchor plate, which may be fastened to the structure via a plurality of fasteners. A position of the door or panel relative to the hinge may be adjusted by loosening the support fasteners coupling the inner plate to the outer plate such that the door or panel may be repositioned in a lateral direction relative to the inner and outer plates via the slider piece disposed within the panel (e.g., using a hand tool, maneuvering the entire panel to the desired alignment position, etc.). Once repositioned, the door or panel may be fixed in place through tightening of the support fasteners such that the panel is secured between the inner and outer plates at the desired position.

In various embodiments, the inner plate may include a second slot disposed above the support fasteners. The second slot may be configured to receive an indicator tab coupled to the slider piece, such that a lateral adjustment of the panel within the first slot of the slider piece relative to and facilitated by the boss feature may be indicated by a corresponding position of the slider piece indicator tab within the second slot.

In various embodiments, the joint formed by the rotatable coupling of the outer plate and the anchor plate may be disposed within a cutout or recess within the door or panel. In various embodiments, the outer plate may have a protruding lip that is supported within the cutout or recess within the door or panel.

In various embodiments, the inner plate may include one or more gaskets along a perimeter of the inner plate disposed between the inner plate and the panel or door such that the inner plate is supported on the door or panel by compression of the gaskets resulting from tightening of the support fasteners. In various embodiments, the outer plate may include one or more gaskets disposed between the outer plate and the panel or door such that the outer plate is supported on the door or panel by compression of the gaskets resulting from tightening of the support fasteners. In various embodiments, the one or more gaskets may protect the panel or door from abrasive contacts (e.g., contact with the support fasteners, contact with the inner and/or outer plate, etc.).

In various embodiments, the hinge assembly may include one or more cover assemblies, wherein the one or more cover assemblies may include, but are not limited to, an inner cover, an outer cover, and a door-side cover. In various embodiments, the inner cover may be fitted over the inner plate to conceal the support fasteners, slider piece indicator tab, and gaskets. In various embodiments, the outer cover may be fitted over the outer plate to conceal the support fasteners. In various embodiments, the door-side cover may be fitted over the anchor plate to conceal the fasteners disposed therein. In various embodiments, the cover assembly may be customized or selected to fit a particular aesthetic finish (e.g., chrome finish, shiny, matte, matte black, varying colors and/or gloss, etc.)

The present disclosure provides an adjustable hinge assembly that enables adjustment of a pivoting door or panel on a side of the hinge that is coupled to the door or panel. Positional adjustment of the door or panel on the hinge-coupled side enables the door or panel to be installed last within a structure, separate from the hinge itself. Accordingly, the door or panel may be installed in a correct position from initial coupling, which prevents risk of potentially damaging opposite side strike (i.e., striking of the door or panel on a door jamb, threshold, and/or surrounding structural framework). Furthermore, the adjustable hinge assembly facilitates adjustment of the door or panel relative to the hinge without requiring repeated or iterative repositioning or adjustment, as is typically required with traditional installation methods for pivoting doors or panels, which frequently involve shimming and/or other jamb or mount-side adjustments. The adjustable hinge assembly also provides flexibility of design, as the adjustable hinge may be configured to adapt to a variety of pivoting panels or doors without requiring a full-length hinge or obtrusive assemblies to correct out-of-plumb conditions or to accommodate varying fit conditions. Accordingly, the provided adjustable hinge assembly enables simple, intuitive, and streamlined installation/adjustment of a pivoting door or panel with minimal risk to the pivoting door or panel.

Referring generally to the figures, an adjustable hinge assembly may be configured to couple a pivoting door or panel ("hereinafter panel") to a wall, frame, or other structure (hereinafter "structure"). The hinge assembly may include an inner plate, an outer plate, and an anchor plate. The anchor plate may be configured to receive a plurality of fasteners to couple the anchor plate to the structure. The outer plate, which may be rotatably coupled to the anchor plate at a joint, is positioned on an opposite side of the panel as the inner plate. In various alternate embodiments, the configuration could be swapped such that the inner plate may be rotatably coupled to the anchor plate at a joint and positioned on an opposite side of the panel as the outer plate. The inner plate and the outer plate may be coupled via support fasteners, which extend from the inner plate through a cutout in the panel to the outer plate, or vice-versa. The cutout is dimensioned such that a length of the cutout is greater than a width of the boss feature, which when loosened, the support fasteners and the coupled plates may enable adjustment of the panel relative to the hinge to accommodate varying fits and/or out-of-plumb conditions of the structure. Alternatively, during installation of the panel, the hinge assembly may be loosely coupled to the panel to allow adjustment of the panel into a desired position, after which the hinge may be anchored to the structure. Once the panel is suitably positioned, and the hinge anchor plate is secured, the support fasteners may then be tightened to fix the panel relative to the hinge. In various embodiments, this adjustability can enable streamlined panel installation (i.e., requiring a single or minimal installation attempts). For example, the hinge may enable panel installation equidistant from a floor by supporting the panel with one or more shims/installation blocks of equal height.

In various embodiments, the hinge assembly may also include a slider piece, configured to fit within the cutout in the panel and having a slot disposed therethrough. The slider piece, which may be press-fit within the panel cutout, may comprise one or more low-friction materials to facilitate ease of adjustment of the hinge assembly relative to the panel. The hinge assembly is configured such that the support fasteners, which couple the inner plate to the outer plate, pass through and are supported within the slot of the slider piece. The slot within the slider piece may have a length that is greater than a width of the boss feature such that the fasteners, and thus the inner and outer plates, may be adjusted relative to the panel to accommodate varying fits and/or out-of-plumb conditions. In various embodiments, the slot within the slider may correspond to a width equal to the boss feature and the panel cutout may have a length that is greater than a length of the slider, which may enable adjustment of the panel relative to the hinge assembly, including the slider, to accommodate varying fits.

In various embodiments, the inner plate or outer plate may include a second slot disposed above the support fasteners. In various embodiments, the slider piece may include an indicator tab disposed on a top portion of the slider piece. In various embodiments, the indicator tab may be coupled to slider piece. In other embodiments, the indicator tab may be integrally formed within the slider piece. In various embodiments, the second slot may be configured to receive the indicator tab such that a lateral adjustment of the panels around the boss feature may be indicated by a corresponding position of the slider piece indicator tab within the second slot.

In various embodiments, the outer plate may have a length that is greater than a length of the inner plate such that the outer plate extends to an edge of the door or panel nearest to the structure. As previously described, the outer plate edge nearest the structure may be rotatably coupled at a joint to an anchor plate. In various embodiments, the joint formed by the rotatable coupling of the outer plate and the anchor plate may be disposed within an edge cutout or recess within the panel. In various embodiments, the outer plate may have a protruding lip that is supported within the edge cutout or recess within the door or panel. In various embodiments, the joint and the protruding lip may be integrally formed. In various embodiments, the outer plate and the anchor plate are rotatably coupled via a press fit assembly or one or more fasteners, and including wear resistant and low friction material which facilitate axial rotation about the joint. In various embodiments, the outer plate and the anchor plate are configured to mutually engage to enable rotation of the outer plate relative to the anchor plate.

In various embodiments, the inner plate may include one or more gaskets or spacers along a perimeter of the inner plate disposed between the inner plate and the panel or door such that the inner plate is supported on the door or panel by the one or more gaskets or spacers. In various embodiments, the outer plate may include one or more gaskets or spacers disposed between the outer plate and the panel or door such that the outer plate is supported on the door or panel by the one or more gaskets or spacers. In various embodiments, the one or more gaskets or spacers may comprise one or more elastic or viscoelastic materials.

In various embodiments, the hinge assembly may be coupled to a cover assembly, wherein the cover assembly may include an inner cover, an outer cover, and a door-side cover. In various embodiments, the inner cover may be configured to fit over an external portion of the inner plate to conceal exposed portions of the support fasteners, slider piece indicator tab, and gaskets. In various embodiments, the outer cover may be configured to fit over an external portion of the outer plate to conceal exposed portions of the support fasteners and/or features configured to receive or engage with the support fasteners. In various embodiments, the door-side cover may be configured to fit over an exterior portion of the anchor plate to conceal exposed portions of the fasteners disposed therein. In various embodiments, the cover assembly may be customized or selected to fit a particular aesthetic finish (e.g., chrome finish, shiny, matte, matte black, varying colors and/or gloss, etc.). In various embodiments, the cover assembly may be coupled to the inner plate, outer plate, and anchor plate via press-fit or snap-on connections. In various embodiments, at least one of the outer plate, the inner plate, and the anchor plate may have a particular aesthetic finish (e.g., chrome finish, matte, etc.) wherein portions of fasteners disposed therein remain unexposed such that a cover assembly is unneeded.

Turning now to the figures and referring specifically to FIG. 1, a perspective view of an adjustable hinge 100 is shown, according to an exemplary embodiment. As shown in FIG. 1, the hinge 100 facilitates coupling a panel 10 to a structure (e.g., frame, wall, etc.) via an anchor plate 105. The anchor plate 105 may be affixed to the structure via a plurality of fasteners 110 (e.g., screws, nails, etc.). In various embodiments, the panel 10 may be a pivoting panel or door. In various embodiments, the panel 10 may be a pivoting glass panel or door, such as for a shower. The panel 10 may be any type of panel or door configured for pivotal movement, such as in a home or building. Although FIG. 1 shows the hinge 100 having three fasteners 110, in various embodiments, the hinge 100 may include any number of fasteners 110 for affixing the anchor plate 105 to the structure. As shown, the anchor plate 105 is rotatably coupled to the outer plate 125 at a joint 113, which is formed by an arm 115 of the anchor plate 105 engaging with a receiving portion (e.g., lip) 120 of the outer plate 125. In various embodiments, the receiving portion 120 is disposed near an end of the outer plate 125 (and the joint 113), which is positioned closest to an edge of the panel 10 when the hinge 100 is coupled to the panel 10. In various embodiments, the arm 115 and the receiving portion 120 are mutually coupled by a fastener or pin via a press fit installation, about which the outer plate 125 may rotate relative to the anchor plate 105. In various embodiments, the arm 115 and the receiving portion 120 may have a low friction or wear resistant material (e.g., bushing) disposed therebetween. In various embodiments, the arm 115 and the receiving portion 120 may interconnect to form a rotatable coupling at joint 113. In various embodiments, joint 113 may include one or more rotational dampers to enable control of rotation of the hinge 100 at the joint 113.

As shown, the outer plate 125 is disposed on an opposite side of the panel 10 as an inner plate 130. The outer plate 125 and the inner plate 130 are substantially parallel. The inner plate 130 may be coupled to the outer plate 125 through the panel 10 via support fasteners 135. Although FIG. 1 shows 2 fasteners 135, in various embodiments, the hinge 100 may include any number of fasteners 135 to affix the outer plate to the inner plate. In various embodiments, support fasteners 135 may be screws, bolts, etc., which may be selectively tightened/loosened and having sufficient length to pass through the inner plate 130 and the panel 10 to engage with the outer plate 125. The support fasteners 135 may pass through a cutout within the panel 10 such that when the support fasteners 135 are sufficiently loosened, lateral movement of the panel 110 or the slider 140 and the coupled plates 125 and 130 is enabled. As shown, the hinge 100 includes a slider piece 140, which is disposed within the panel 10 (i.e., within the cutout), includes a groove on which the (e.g., contained within a boss feature of the outer panel 125) may be supported as they pass through the cutout of the panel 10.

Figure 2:
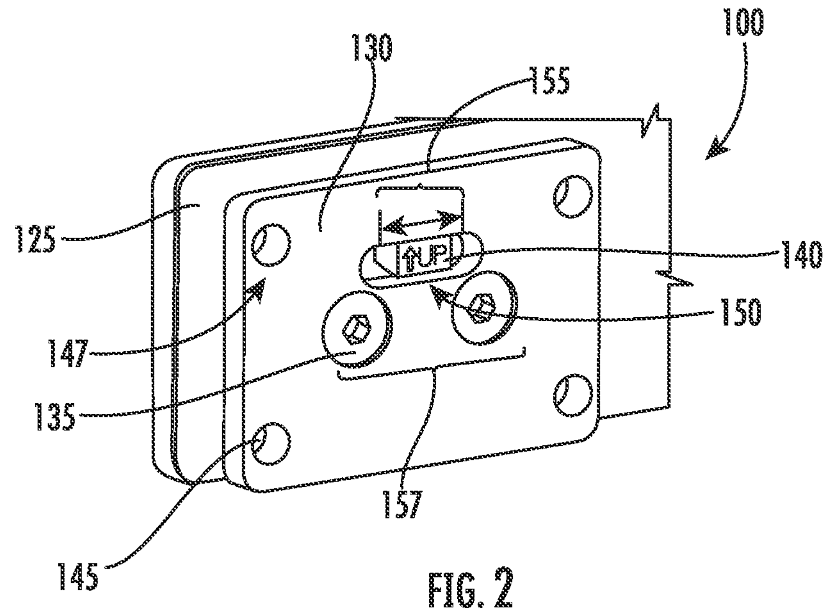
FIG. 2 is a perspective view of the adjustable hinge of FIG. 1 near a sliding portion.

FIG. 2 shows a perspective view of the hinge 100 near the inner plate 130, according to an exemplary embodiment. As shown, the inner plate 130 may interface with one or more gaskets 145 disposed between the inner plate 130 and the panel 10, which may facilitate support of the inner plate cover onto the inner plate. In various embodiments, the one or more gaskets 145 may be disposed along a perimeter of the inner plate 130. In various embodiments, gaskets 145 may form a continuous or contiguous gasket portion disposed along the perimeter of the inner plate 130. In various embodiments, the outer plate 125 may include a continuous gasket or a plurality of gasket similar or equivalent to gasket 145 to facilitate support of outer plate relative to the panel 10.

In various embodiments, at least one of the inner plate 130 and the outer plate 125 may include one or more apertures 147, which are configured to facilitate supporting and/or coupling of one or more plate covers to the inner plate 130 and/or the outer plate 125. Although FIG. 2 shows the inner plate 130 having four apertures 147, in various embodiments, inner plate 130 and/or outer plate 125 may include any number of apertures 147.

As shown in FIG. 2, the inner plate 130 includes a slot 150 disposed above the support fasteners 130. The slot 150 may be configured to receive a portion of the slider piece 140, such that lateral adjustment of the panel 10 relative to the hinge 100 may be visually indicated by a corresponding lateral position of the slider piece 140 within the slot 150. As shown, a width 155 of the slot 150 may be the same or less than a width 157 between the support fasteners 135. Conversely, as previously described, a length of the slot 150 within the slider piece 140 may be greater than the width 157 between the support fasteners 135.

Figure 3:
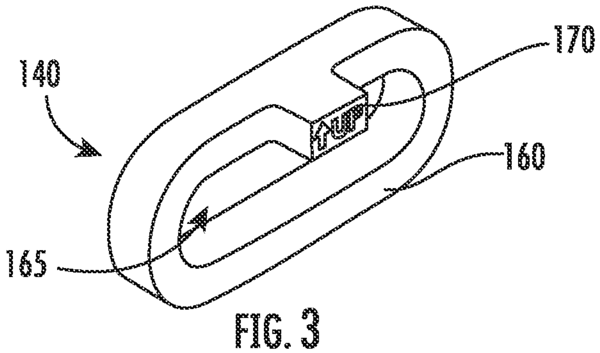
FIG. 3 is a perspective view of a slider configured to fit within the adjustable hinge of FIG. 1, according to an exemplary embodiment.

FIG. 3 shows a perspective view of the slider piece 140, according to an exemplary embodiment. As shown, the slider piece 140 includes an outer frame portion 160, which defines a slot 165. The slider piece 140 is configured to fit within a cutout in the panel 10 such that the frame portion 160 (or an outer edge of the frame portion 160) interfaces and/or engages with a perimeter of the cutout in panel 10. Accordingly, when the slider piece 140 is positioned within the panel 10, the slider piece 140 remains stationary relative to the panel 10.

Figure 4:
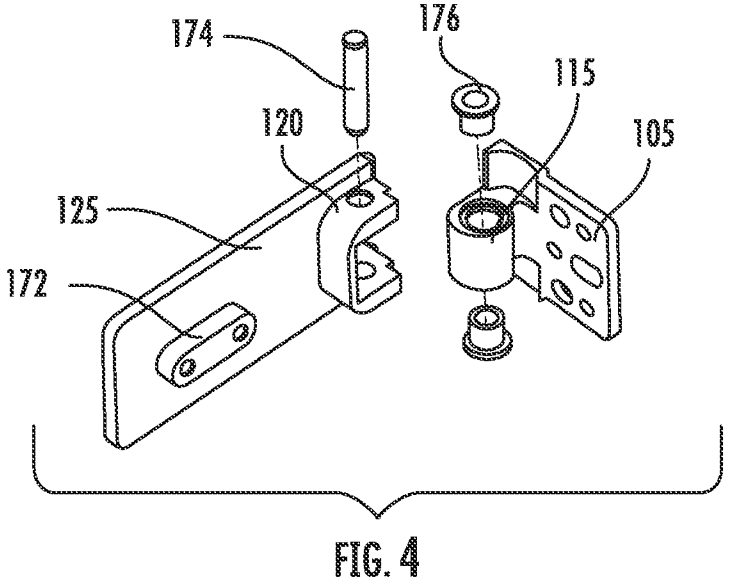
FIG. 4 is an exploded perspective view of an outer plate and anchor plate for the adjustable hinge of FIG. 1, according to an exemplary embodiment.

FIG. 4 shows a perspective exploded view of the outer plate 125 and the anchor plate 105, according to an exemplary embodiment. As shown, the outer plate 125 may include a boss feature 172, which is configured to receive support fasteners 135. Furthermore, the slot 165 within the sliding piece 140 may be configured to receive the boss feature 172 of outer plate 125, such that the support fasteners 135 may pass through the inner plate 130, the slot 165, and into the boss feature 172 to facilitate coupling of the inner plate 130 to the outer plate 125. In various embodiments, the boss feature 172 on the outer plate 125 and the slot 165 of the slider piece 140 may be sufficiently sized to enact a clamping force on panel 10 or to prevent clamping of the panel 10 at the interface between the boss feature 172 and the slot 165. In various embodiments, the panel 10 may have a varied thicknesses. In some embodiments, the boss feature 172 may be made of or coated by one or more friction resistant materials to facilitate sliding within the slot 165.

As shown in FIG. 4, the outer plate 125 and the anchor plate 105 may be rotatably coupled via pin 174 and/or bushings 176, which may configured to engage with the arm 115 of the anchor plate 105 and the receiving portion 120 of the outer plate 125.

In various embodiments, the slider piece 140 may include one or more materials having frictionless or low-friction properties to facilitate ease of lateral movement of the boss feature 172 therein. As shown, the slider piece 140 includes an indicator tab 170 located on a top portion of the slider piece 140. In various embodiments, the indicator tab 170 may be coupled to the frame portion 160 of the slider piece 140. In various embodiments, the indicator tab 170 may be integrally formed with the frame portion 160. As evident from FIGS. 2 and 3, the indicator tab 170 may fit within the slot 150 of the inner plate 135 such that a position of the indicator tab 170 indicates an amount of lateral movement of the support fasteners 135 within the slot 165 resulting from adjustment of the panel 10 relative to the hinge 100. In various embodiments, the indicator tab 170 may be utilized to cause adjustment of the hinge 100 relative to the panel 10. In some embodiments, the indicator tab 170 may be leveraged by a tool (e.g., screwdriver) to cause lateral movement of the slider 140, and thus the panel 10, relative to the boss feature 172, which may result in adjustment of the hinge 100 relative to the panel.

Figure 5:
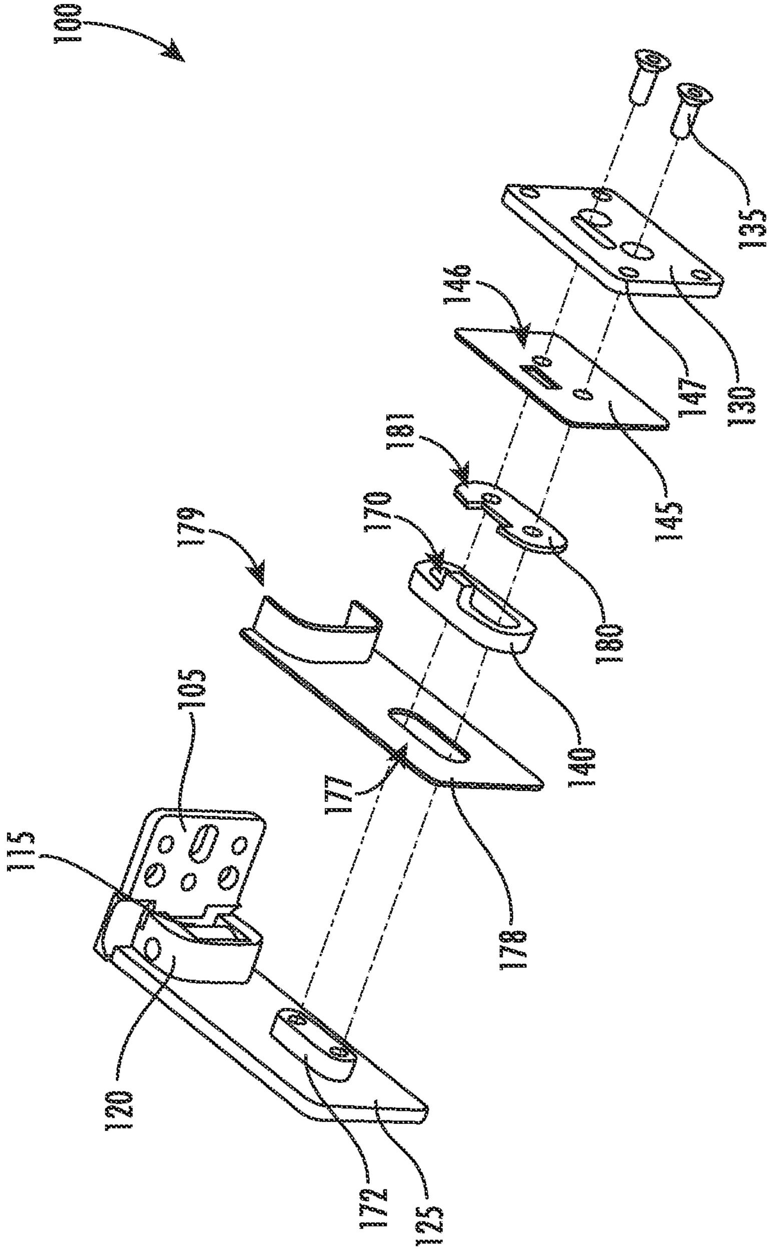
FIG. 5 is an exploded perspective view of the adjustable hinge of FIG. 1, according to an exemplary embodiment.

FIG. 5 shows a perspective exploded view of the hinge 100, according to an exemplary embodiment. As shown, the hinge 100 may include one or more additional gaskets and/or spacers adjacent to at least one of the outer plate 125 and the inner plate 130. As illustrated, a gasket 145 may be disposed between the inner plate 130 and the panel 10 to provide support and/or to prevent abrasive contact therebetween. As shown, the gasket 145 may include one or more cutouts or apertures 146 disposed therethrough, where the apertures 146 are formed to have a generally complementary shape to the fasteners 135 and/or the indicator tab 170. In various embodiments, a gasket 178 may be disposed between the outer plate 125 and the panel 10 to facilitate support and/or to prevent abrasive contact therebetween. As shown, the gasket 178 may include an elongated opening 177, which may be complementary in shape to the boss feature 172, and a cover portion 179, which may be complementary in shape and configured to interface with the receiving portion 120 of the outer plate 125.

In various embodiments, the hinge 100 may include a slider spacer 180, which is configured to fit within the slot 165 of the slider piece 140. In various embodiments, the support fasteners 135 may pass through the slider spacer 180 (e.g., through one or more holes or apertures disposed therethrough) such that the slider spacer 180 supports the slider 140. As shown, the slider spacer 180 may also include a cutout or recess 181 disposed on an upper portion of the slider space 180, where the recess 181 is configured to accommodate sliding of the indicator tab 170. The slider spacer 180 may additionally ensure sufficient contact between the top surface of slider 140 and the panel 10 while maintaining a gap between the outer gasket 178 and inner gasket 145, which enables substantially free lateral movement of the slider 140 without compression friction, and thus the panel 10, with respect to the inner and outer plates 125 and 130, respectively. In various embodiments, the slider spacer 180 may be configured to move relative to the slot 165 of the slider piece 140 to facilitate adjustment of the panel relative to the hinge 100.

Figure 6:
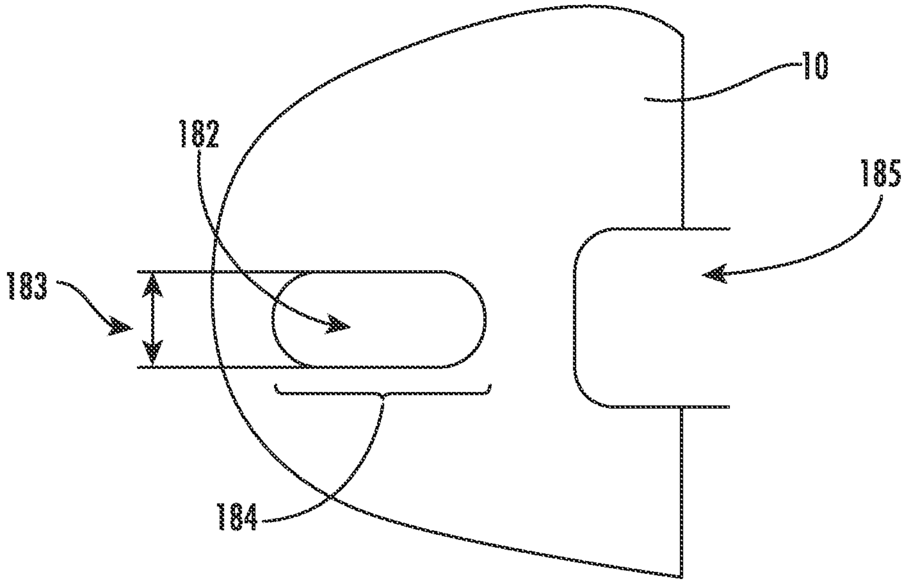
FIG. 6 is a schematic representation of a section of a pivoting door having cutouts configured to fit the slider of FIG. 3 and the adjustable hinge of FIG. 1, according to an exemplary embodiment.

FIG. 6 shows a schematic representation of a side view of a panel 10, according to an exemplary embodiment. As shown, the panel 10 includes a cutout 182 (e.g., slot, hole, aperture), which is configured to receive the slider piece 140. In various embodiments, the slider piece 140 may be coupled to the panel 10 via a press-fit or a snap fit such that the outer frame 160 of the slider piece 140 interfaces or engages with a perimeter of the cutout 182. As illustrated in FIG. 6, the cutout 182 has a height 183 and a width 184, which respectively correspond to a height and width of the outer frame 160 of the slider piece 140.

As shown in FIG. 6, the panel 10 may include a second edge cutout or recess 185 along an edge of the panel 10 near the structure to which the panel 10 may be coupled. The recess 185 may be configured to receive joint 113 such that a perimeter of the recess 185 engages, interfaces with, and/or supports the receiving portion 120 of the outer plate 125. In various embodiments, the receiving portion 120 of the outer plate 125 may be press-fit or snap fit into the recess 185.

Figure 7:
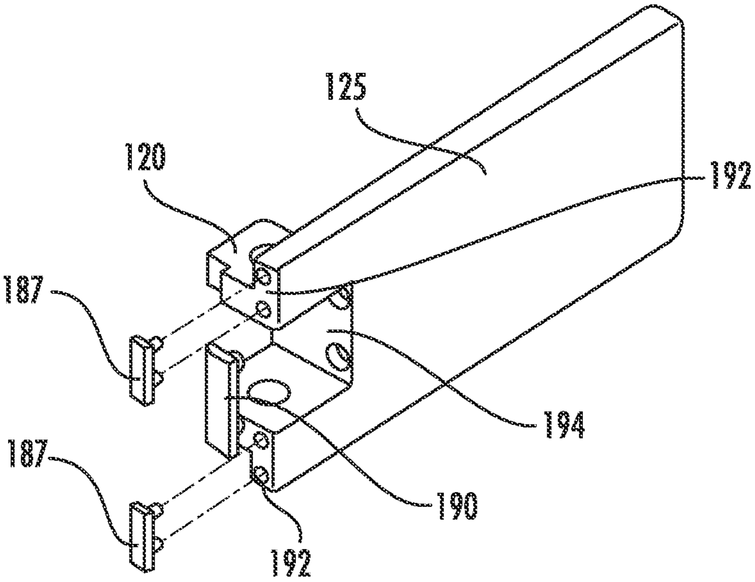
FIG. 7 is a perspective view of the outer plate of the adjustable hinge of FIG. 1, according to an exemplary embodiment.
Figure 8:
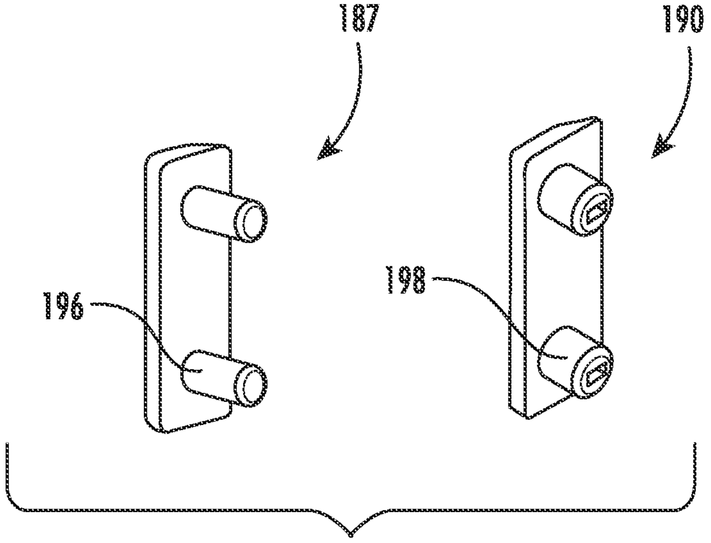
FIG. 8 is a perspective view of stoppers within the adjustable hinge of FIG. 1, according to an exemplary embodiment.

FIG. 7 shows a perspective view of the outer plate 125, according to an exemplary embodiment. In various embodiments, the hinge 100 may include one or more stoppers and/or dampers, which may be used in between the outer plate 125 and anchor plate 105 to avoid abrasive (e.g., metal on metal) or otherwise detrimental contact between members of hinge 100. In various embodiments, the stoppers or dampers may include one or more elastic or viscoelastic materials. As shown in FIG. 7, the outer plate 125 may be configured to receive stoppers 187 and 190 at ends 192 and 194, respectively. In various embodiments, the stoppers 187 and 190 are configured to prevent abrasive, vibrational (e.g., noise), or other detrimental contact between members of hinge 100 (e.g., between the outer plate 125 and the arm 115 and/or the anchor plate 105) when the hinge 100 is in a closed and an open position, respectively. For example, the stoppers 187 may prevent detrimental contact between the outer plate 125 and the anchor plate 105 and the stopper 190 may prevent detrimental contact between the outer plate 125 and the arm 115. As shown in FIG. 8, the stoppers 187 and 190 may include extruded elements 196 and 198, respectively, which are configured to engage with the outer plate 125 and enable coupling thereto (e.g., via press-fit or friction fit).

Figure 9:
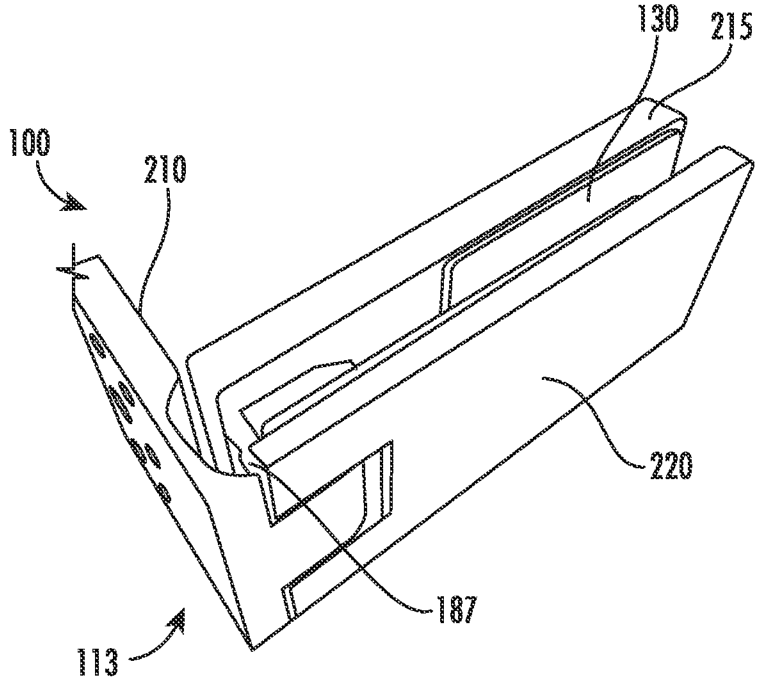
FIG. 9 is a perspective view of an adjustable hinge, according to another exemplary embodiment.
Figure 10:
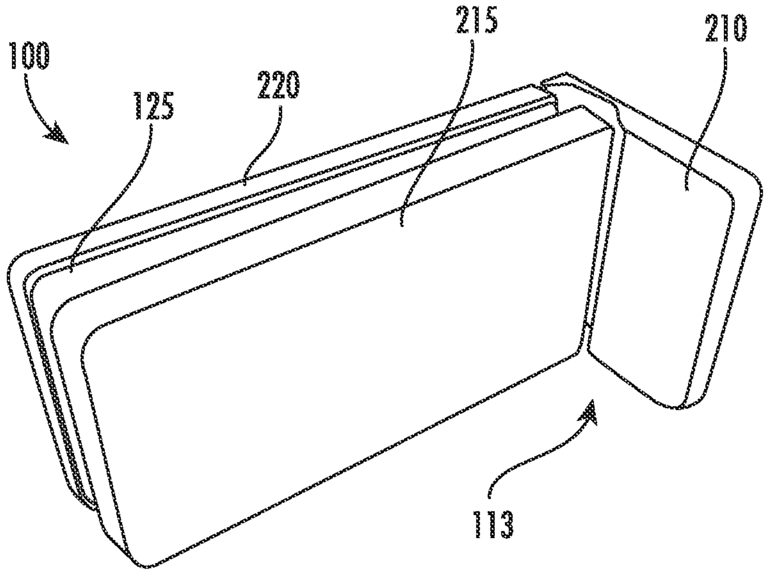
FIG. 10 is a perspective view of an adjustable hinge having a coupled cover assembly, according to another exemplary embodiment.

FIGS. 9 and 10 show perspective views of the hinge 100, according to various exemplary embodiments. As shown, hinge 100 may include a cover assembly having an anchor plate cover 210, an inner cover 215, and an outer cover 220. To conceal exposed components within the hinge 100, the anchor plate cover 210, the inner cover 215, and the outer cover 220 may be coupled to exterior portions of the anchor plate 105, the inner plate 130, and the outer plate 125, respectively. In various embodiments, each of the anchor plate cover 210, the inner cover 215, and the outer cover 220 may be configured to couple to the anchor plate 105, the inner plate 130, and the outer plate 125, respectively, via a press-fit or snap-fit coupling through the apertures 147 on the plates. In various embodiments, each of the anchor plate cover 210, inner plate 130, and the outer plate 125 may include a protruding feature (e.g., ridge or rim) along an inner edge to facilitate coupling the components within the hinge 100. In various embodiments, the cover assembly may conceal components within the hinge 100 having recesses, varied surfaces, crevices, etc. that may be difficult or time consuming to clean (e.g., fastener heads). In various embodiments, the cover assembly may provide aesthetic benefit and may be customizable based on a desired appearance of the hinge 100. As shown in FIG. 9, the cover assembly may include an anchor plate cover 210, inner cover 215, and outer cover 220 having a smooth, black finish. As shown in FIG. 10, the cover assembly may include an anchor plate cover 210, inner cover 215, and outer cover 220 having a chrome finish. Various embodiments of the cover assembly may have any other desired aesthetic finish known in the art.

Accordingly, when the hinge 100 is implemented to couple the panel 10 to a structure, the slider piece 140 may be inserted into (e.g., via press-fit, snap-fit, etc.) the cutout 182 of the panel 10. As noted previously, when the slider piece 140 is inserted into the panel 10, the slider piece 140 remains stationary relative to the panel 10. The inner plate 130 and the outer plate 125 may be coupled together through the panel 10 via the support fasteners 135, which may engage with the boss feature 172 on the outer plate 125, and pass through the slot 165 within the slider piece 140. The outer plate 125 may be coupled to the anchor plate 105 (via the arm 115) and the anchor plate 105 may be coupled to a structure prior to coupling the inner plate 130 to the outer plate 125. The indicator tab 170, which is disposed within and laterally articulates relative to the slot 150 as the panel 10 moves (i.e., when the hinge 100 articulates), indicates lateral movement of the panel 10 within the slot 165 and, thus, indicates an adjustment position of the panel 10 relative to the hinge 100. As the inner plate 130 and the outer plate 125 are mutually coupled, the receiving portion 120 of the outer plate 125 may be positioned within and engage with the recess 185 of the panel 10. The anchor plate 105 may also be coupled to the structure via the fasteners 110. Finally, to adjust for potential out-of-plumb conditions of the panel 10 and the structure, the indicator tab 170 of the slider piece 140 may be used to indicate movement of the panel 10 relative to the boss feature 172 and thus indicate adjustment of the panel 10 relative to the hinge 100. When the panel 10 and the hinge 100 have been suitably adjusted to correct for fit and/or out-of-plumb conditions, the support fasteners 135 may be tightened such that the inner plate 130 and the outer plate 125 exert a force on the panel 10 to hold the panel 10 in the adjusted position. Should repositioning of the panel 10 become necessary, the support fasteners 135 may be loosened and the panel 10 may be repositioned relative to the hinge 100 by sliding the panel 10 relative to the boss feature 172. Accordingly, the hinge 100 may be installed within a structure and loosely coupled to the panel 10. Correction of out-of-plumb conditions may then be addressed by articulating the hinge 100, allowing the panel 10 (via the slider piece 140) to slide relative to the hinge 100 components thereby correcting out-of-plumb conditions, and adjusting (i.e., tightening) the support fasteners 135 to maintain the panel 10 in the corrected position.

Notwithstanding the embodiments described above and shown in FIGS. 1-10, various modifications and inclusions to those embodiments are contemplated and considered within the scope of the present disclosure.

As utilized herein with respect to numerical ranges, the terms “approximately,” “about,” “substantially,” and similar terms generally mean +/−10% of the disclosed values, unless specified otherwise. As utilized herein with respect to structural features (e.g., to describe shape, size, orientation, direction, relative position, etc.), the terms “approximately,” “about,” “substantially,” and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term “coupled” and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If “coupled” or variations thereof are modified by an additional term (e.g., directly coupled), the generic definition of “coupled” provided above is modified by the plain language meaning of the additional term (e.g., “directly coupled” means the joining of two members without any separate intervening member), resulting in a narrower definition than the generic definition of “coupled” provided above. Such coupling may be mechanical, electrical, or fluidic.

References herein to the positions of elements (e.g., “top,” “bottom,” “above,” “below”) are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the cover assembly of the exemplary embodiment described in at least paragraph [0050] may be incorporated in the hinge 100 of the exemplary embodiment described in at least paragraph [0037]. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A hinge comprising:

a first plate;

a second plate rotatably coupled to the first plate at a joint;

a third plate disposed substantially parallel to the second plate; and a slider piece disposed between the second plate and the third plate, the slider piece having a first slot disposed therein;

wherein the second plate is coupled to the third plate via at least one fastener, wherein the at least one fastener is configured to slide within the first slot of the slider piece; and wherein the third plate comprises a second slot disposed therethrough, wherein the second slot is configured to receive a portion of the slider piece.

2. The hinge of claim 1, wherein the second plate is rotatably coupled to the first plate via an arm extending from the first plate.

3. The hinge of claim 2, wherein the second plate comprises a receiving portion disposed at an end of the second plate nearest the joint, and wherein the receiving portion is configured to connect with the arm of the first plate to form a joint.

4. The hinge of claim 3, wherein the joint includes a damper to control rotation at the joint.

5. The hinge of claim 1, wherein the slider piece comprises a tab, and wherein the tab is configured to fit within the second slot.

6. The hinge of claim 5, wherein the slider piece comprises a frame, the first slot being defined by the frame, and wherein the tab is disposed within a top portion of the frame.

7. The hinge of claim 5, wherein the at least one fastener includes two fasteners, and wherein a width of the second slot corresponds to a distance between the two fasteners.

8. A hinge system for a panel comprising:

a first plate configured for coupling to a structure;

a second plate rotatably coupled to the first plate and disposed on a first side of the panel;

a third plate disposed on a second side of the panel opposite the first side; and a slider piece disposed within the panel, the slider piece having a first slot disposed therein;

wherein the second plate is coupled to the third plate via at least one fastener, wherein the at least one fastener is configured to slide within the first slot of the slider piece such that the panel may translate relative to the second and the third plates; and wherein the third plate comprises a second slot disposed therethrough, wherein the second slot is configured to receive a portion of the slider piece.

9. The hinge system of claim 8, further comprising a first gasket and a second gasket, the first gasket being disposed between the second plate and the panel and the second gasket being disposed between the third plate and the panel.

10. The hinge system of claim 8, wherein the second plate includes a receiving portion, the receiving portion being configured to fit within a recess of the panel.

11. The hinge system of claim 10, wherein the second plate further includes a boss feature, the boss feature configured to receive the at least one fastener.

12. The hinge system of claim 8, wherein the slider piece comprises a tab, and wherein the tab is configured to fit within the second slot.

13. The hinge system of claim 12, wherein a position of the tab indicates a position of the panel.

14. The hinge system of claim 8, further comprising at least one stopper, wherein the second plate is configured to receive the at least one stopper, the at least one stopper configured to prevent abrasive contact between the second plate and the first plate.

15. The hinge system of claim 14, wherein the at least one stopper includes a first stopper and a second stopper, the first stopper being received at a first end of the second plate and the second stopper being received at a second end of the second plate.

16. The hinge system of claim 8, further comprising a cover assembly, the cover assembly comprising:

a first cover configured to conceal the first plate;

a second cover configured to conceal the second plate; and a third cover configured to conceal the third plate.

17. The hinge system of claim 16, wherein at least one of the first cover, the second cover, or the third cover is respectively coupled to the first plate, the second plate, or the third plate via a snap fit connection.

18. A method of mounting a panel comprising:

inserting a slider piece into a panel;

positioning a first plate on a first side of the panel;

positioning a second plate on a second side of the panel; and coupling the second plate to the first plate using at least one fastener, wherein the at least one fastener is configured to pass through and slide relative to a first slot within the slider piece; and wherein a portion of the slider piece is configured to be received within a second slot disposed within the second plate.

19. The method of claim 18, further comprising positioning the panel relative to the first plate and the second plate.

20. The method of claim 19, further comprising tightening the at least one fastener after positioning the panel.

* * * * *